US005721428A

United States Patent [19]

Naito et al.

[11] Patent Number: 5,721,428

[45] Date of Patent: Feb. 24, 1998

[54] MAGNETIC FIELD TYPE MASS SPECTROMETER

[75] Inventors: Yoshihiko Naito, Kanagawa-ken; Kazutoshi Nagai, Tokyo; Osamu Horita, Kanagawa-ken, all of Japan

[73] Assignee: Ebara Corporation, Tokyo, Japan

[21] Appl. No.: 579,633

[22] Filed: Dec. 26, 1995

[30] Foreign Application Priority Data

Dec. 28, 1994 [JP] Japan .................................... 6-340080
Oct. 13, 1995 [JP] Japan .................................... 7-292035

[51] Int. Cl.[6] ............................ B01D 59/44; H01J 49/00

[52] U.S. Cl. ............................................. 250/299; 250/298

[58] Field of Search .................................... 250/296, 297, 250/298, 299, 300, 397

[56] References Cited

U.S. PATENT DOCUMENTS

| | | | |
|---|---|---|---|
| 2,824,987 | 2/1958 | Weissenberg et al. . | |
| 3,126,477 | 3/1964 | Noda et al. | 250/299 |
| 3,500,042 | 3/1970 | Castaing et al. | 250/298 |
| 3,585,383 | 6/1971 | Castaing et al. | 250/298 |

OTHER PUBLICATIONS

2107A Nuclear Instruments & Methods in Physics Research A258 (1987) Aug. 15, No. 3, Amsterdam, The Netherlands, "The Electrostatic Systems Used for the Multipassage Magnetic Mass Spectrometers", Berger et al, pp. 335–338.

2001A Revue de Physique Appliquée, vol. 14, No. 8 (1979.Aug.), "Les aberrations des miroirs bicylindres et leurs effets sur les propriétés des spectrométres de masse magnétiques á multiples passages", Berger et al, pp. 783–789.

Berger et al., *Nuc. Instruments and Methods in Physics Res.*, A258, pp. 335–338, "The Electrotatic Systems Used for the Multipassage Magnetic Mass Spectrometers", (1987).

Berger et al, *Revue De Physique Applique*, "Les aberrations des miroirs bicylindres et leurs effets sur les propriétés des spectrométres de masse magnétiques á multiples passages", vol. 14, No. 8, 1979.

*Primary Examiner*—Bruce Anderson
*Attorney, Agent, or Firm*—Nikaido, Marmelstein, Murray & Oram LLP

[57] ABSTRACT

A magnetic field type mass spectrometer having an ion source, an ion accelerator, a mass separation magnet forming an analyzing part which changes the trajectory of ions by a magnetic field of the mass separation magnet, and a current detector, wherein the mass separation magnet is installed so that ions move along a trajectory which turns several times in the analyzing part, and repelling electrodes are installed at turning points of the ions, whereby ions generated from the ion source are caused to move along a trajectory which turns several times in the analyzing part. Mass separation is carried out along each trajectory, which provides high resolution.

7 Claims, 8 Drawing Sheets

MAGNETIC FIELD TYPE MASS SPECTROMETER

BACKGROUND OF THE INVENTION

1. Field of the Art

The present invention relates to a magnetic field type mass spectrometer using a mass separation magnet and, more particularly, to a magnetic field type mass spectrometer which is compact in size and provides high resolution.

2. Prior Art

A magnetic field type mass spectrometer using a mass separation magnet is known.

FIG. 11 schematically shows an arrangement of a conventional magnetic field type mass spectrometer. In the figure, reference numeral 1 denotes an ion source, 2 an electrode for ion acceleration, 2' a power supply for ion acceleration, 3-1 a magnetic field entrance slit, 3-2 a magnetic field exit slit, 4 a magnet for analysis, 5 a grounding electrode, 6 an electrode for ion current detection, and 7 an ammeter. The magnetic field entrance slit 3-1 and the magnetic field exit slit 3-2 are formed in the walls of the grounding electrode 5. The magnet 4 for analysis includes a pair of upper and lower disk-shaped magnets which are disposed with a predetermined space being left therebetween. An empty space A between the pair of magnets forms a magnetic field of an analyzing part in which a magnetic flux running, for example, from this side of the plane of the figure to the other side thereof is produced.

In the magnetic field type mass spectrometer arranged as described above, ions which are generated from the ion source 1 are accelerated to a constant energy level by the ion accelerating electrode 2 and are introduced into the magnetic field formed in the analyzing part A by the magnet 4 for analysis. In the magnetic field, ions effect a circular motion along a trajectory having a radius determined according to the mass-to-charge ratio and the velocity of ions. The magnetic field exit slit 3-2, which is provided at the exit of the magnetic field, is arranged to allow passage of only ions moving along a trajectory with a predetermined radius determined by the acceleration energy, the mass-to-charge ratio and the velocity of ions. Thus, it is possible to carry out mass spectrometric analysis of ions which have passed through the magnetic field exit slit 3-2.

However, in the above-described conventional magnetic field type mass spectrometer, in order to improve the resolution of mass spectrometric analysis, it was necessary to narrow the magnetic field entrance slit 3-1 and the magnetic field exit slit 3-2 or to increase the radius of the ion migration trajectory. The former case involves the problem that sensitivity is lowered as the resolution improves. The latter case involves the problem that the spectrometric apparatus itself becomes large in size and heavy in weight.

SUMMARY OF THE INVENTION

In view of the above-described circumstances, an object of the present invention is to eliminate the above-described problems and to provide a magnetic field type mass spectrometer which is compact in size and light in weight and, at the same time, provides high resolution.

To accomplish the above-described objective, according to first aspect of the invention, a magnetic field type mass spectrometer comprises an ion source, an ion accelerator for accelerating ions from the ion source, a mass separation magnet forming an analyzing part by a magnetic field of the mass separation magnet for changing a trajectory of ions accelerated by the ion accelerator, and a current detector for detecting an ion current, wherein the mass spectrometer is characterized in that the mass separation magnet is installed so that the magnetic field thereof causes ions to move along a trajectory which turns several times in the analyzing part, and repelling electrodes are installed at turning points of the ions, whereby ions generated from the ion source are caused to move along a trajectory which turns several times in the analyzing part. In a preferred embodiment, a mass separation magnet includes a pair of disk-shaped magnets with a space left therebetween and this space forms the magnetic field of the analyzing part.

By adopting the above-described arrangement, a magnetic field type mass spectrometer of the present invention provides a plurality of arc-shaped trajectories along which ions move in the analyzing part for mass spectrometric analysis. The mass separation is carried out along each arc-shaped trajectory. Consequently, mass spectrometric analysis of high resolution can be effected. As a result achieving of high resolution, it is also possible to separate ions of heavy mass which have neighboring mass-to-charge-ratios.

According to a second aspect of the invention, in a magnetic field type mass spectrometer described above, the same electric potential is applied to the repelling electrodes, thus causing only ions of a specific mass to move along a predetermined trajectory in the analyzing part.

Thus, it is possible to pick up only a mass spectrum of specific ions which may be determined depending on the objective of use of the mass spectrometer.

According to a third aspect of the invention, in a magnetic field type mass spectrometer according to the first aspect, in order to effect mass sweep, the same electric potential as an acceleration potential applied to the ion accelerator is applied to the repelling electrodes synchronously with the acceleration potential.

By this arrangement, every mass spectrum of every possible ion of different mass in a gas can be obtained by shifting electric potential synchronously applied to the ion accelerator and the repelling electrodes.

According to a fourth aspect of the invention, in a magnetic field type mass spectrometer according to the first aspect, in order to effect mass sweep, an electric potential which is different from an acceleration potential applied to the ion accelerator can be applied to the repelling electrodes synchronously with the potential applied to the ion accelerator.

By this arrangement, advantageous effects which are similar to those obtained in the mass spectrometer according to the third aspect can be obtained. However, in this arrangement, since an electric potential which is different from the acceleration potential can be applied to the repelling electrodes, it is possible to adjust the trajectory of the ions formed within the analyzing part. Therefore, even if an energy level or speed of ions produced in the ion source is not uniform and includes some fluctuation, it is possible to adjust the trajectory of the ions so that they are most efficiently repelled at the repelling electrodes.

According to a fifth aspect of the invention, in a magnetic field type mass spectrometer described above, a grounding electrode is provided inside the repelling electrodes, and the grounding electrode is provided with ion guiding slits at respective positions corresponding to the repelling electrodes.

The grounding electrode provides a shielding effect to prevent ions which were not passed through the ion guiding slits to strike other elements of the mass spectrometer and prevent miss-measurement. In addition, by providing a grounding electrode, a predetermined level of an electric potential can easily be set at the repelling electrodes and it is, therefore, easy to incorporate a mass spectrometer in other equipment.

According to a sixth aspect of the invention, in a magnetic field type mass spectrometer according to the fifth aspect, the grounding electrode is disposed on the regional boundary of a magnetic field formed by the mass separation magnet.

By this, ions are repelled at a point just after exiting the magnetic field which does not cause interactive collision or scattering of ions and prevents disturbance of the trajectory. Thus, it is possible to obtain a theoretical or designed value of high resolution of the mass spectrometer.

According to a seventh aspect of the invention, a magnetic field type mass spectrometer comprises, an ion source, an ion accelerator for accelerating ions from the ion source, a mass separation magnet forming an analyzing part by a magnetic field of the mass separation magnet for changing a trajectory of ions accelerated by the ion accelerator, and a current detector for detecting an ion current, and is characterized in that the mass separation magnet is installed so that the magnetic field thereof causes ions to move along a trajectory which turns several times in the analyzing part, and a cylindrical repelling electrode for repelling ions is installed at turning points of the ions, and that a grounding electrode which is concentric with the repelling electrode is disposed inside the repelling electrode, the grounding electrode being provided with slits for guiding only ions moving along only a predetermined turning trajectory in the analyzing part to the repelling electrode, whereby ions generated from the ion source are caused to move along a trajectory which turns several times in the analyzing part.

Instead of using a cylindrical repelling electrode, an arcuate repelling electrode may be disposed at each turning point of the ions. By this arrangement, it is possible to make a magnetic field type mass spectrometer as compact.

According to a further aspect of the invention, in a magnetic field type mass spectrometer according to the seventh aspect, the grounding electrode is disposed on the regional boundary of a magnetic field formed by the mass separation magnet.

By adopting this arrangement, advantageous effects which are similar to those described above regarding the sixth aspect can be obtained.

The above and other objects, features and advantages of the present invention will become more apparent from the following description when taken in conjunction with the accompanying drawings in which preferred embodiments of the present invention are shown by way of illustrative examples.

PREFERRED EMBODIMENTS OF THE INVENTION

Embodiment 1

Figure 1:
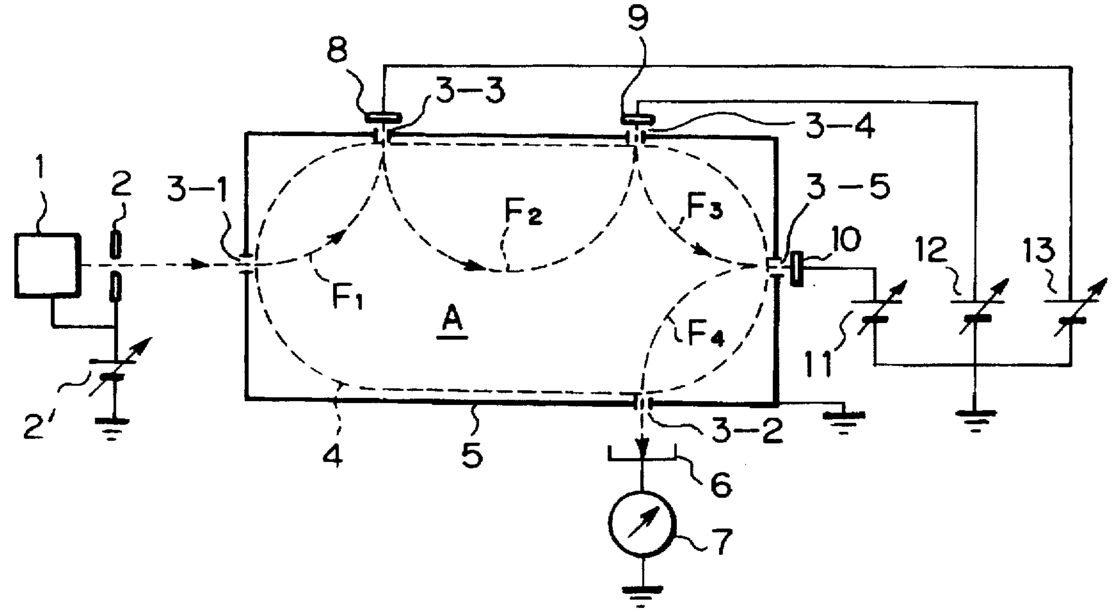
FIG. 1 is a view schematically showing an arrangement of a magnetic field type mass spectrometer according to a first embodiment of the present invention.

Embodiments of the present invention will be described below with reference to the drawings. FIG. 1 schematically shows an arrangement of a magnetic field type mass spectrometer according to a first embodiment of the present invention. In the figure, reference numeral 1 denotes an ion source, 2 an electrode for ion acceleration, 2' a power supply for ion acceleration, 3-1 a magnetic field entrance slit, 3-2 a magnetic field exit slit, 4 a magnet for analysis, 6 an electrode for ion current detection, 7 an ammeter, 8, 9 and 10 repelling electrodes, and 11, 12 and 13 power supplies for repelling electrodes. Further, reference numeral 5 denotes a grounding electrode which is disposed inside the repelling electrodes 8, 9 and 10. The walls of the grounding electrode 5 are provided with slits 3-3, 3-4 and 3-5 at respective positions corresponding to the repelling electrodes 8, 9 and 10. The magnet 4 for analysis includes a pair of upper and lower elliptical magnets which are disposed with a space left therebetween. The empty space between the pair of magnets forms a magnetic field of the analyzing part, in which a magnetic flux running, for example, from this side of the plane of the figure to the other side thereof is produced. It should be noted that the grounding electrode 5 is disposed so as to lie on the regional boundary of a magnetic field formed by the magnet 4 for analysis. By this, ions are repelled at a position just after exiting the magnetic field which does not cause interactive collision or scattering of ions and prevents disturbance of the trajectory. Thus, it is easy to obtain a theoretical or designed value of high resolution of the mass spectrometer.

In the magnetic field type mass spectrometer shown in FIG. 1, ions which are generated from the ion source 1 obtain a predetermined amount of energy at the electrode 2 for ion acceleration. Ions that have obtained energy enter a magnetic field (analyzing part A) formed by the magnet 4 for analysis through the magnetic field entrance slit 3-1. Here, the ions receive force (Lorentz's force) from the magnetic field, and move toward the repelling electrode 8, describing an arc-shaped trajectory $F_1$, and thus reaching the repelling electrode 8 through the slit 3-3. The repelling electrode 8 is under application of an electric potential so as to repel ions. Ions which are turned by the repelling electrode 8 move toward the repelling electrode 9, describing an arc-shaped trajectory $F_2$, and reach the repelling electrode 9 through the slit 3-4.

The repelling electrode 9 is under application of an electric potential so as to repel ions. Ions which are turned by the repelling electrode 9 move toward the repelling electrode 10, describing an arc-shaped trajectory $F_3$, and reach the repelling electrode 10 through the slit 3-5. Ions which are turned by the repelling electrode 10 move toward the magnetic field exit slit 3-2, describing an arc-shaped trajectory $F_4$, and reach the electrode 6 for ion current detection through the magnetic field exit slit 3-2.

In the process of moving along the arc-shaped trajectories $F_1$, $F_2$, $F_3$ and $F_4$, ions are separated into ion species having different circular arcs radius of which is determined according to the mass-to-charge ratio and the velocity of ions, and only specific ions can reach the electrode 6 for ion current detection passing through the slits 3-3, 3-4 and 3-5 and the magnetic field exit slit 3-2. An ammeter 7 is connected to the electrode 6 for ion current detection to detect mass-separated ion species. It should be noted that the power supplies 11, 12 and 13 for repelling electrodes apply a predetermined value of electric potentials to the respective repelling electrodes 8, 9 and 10, causing them to perform an operation of mass-separating ions in the process of passing along the trajectories $F_2$, $F_3$ and $F_4$.

Embodiment 2

Figure 2:
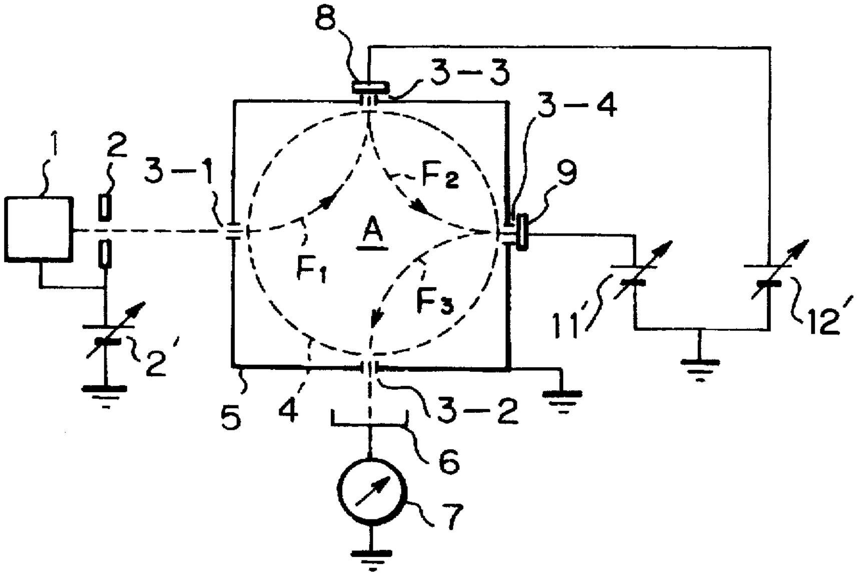
FIG. 2 is a view schematically showing another arrangement of a magnetic field type mass spectrometer according to a second embodiment of the present invention.

FIG. 2 schematically shows another embodiment of a magnetic field type mass spectrometer according to the present invention. In this magnetic field type mass spectrometer, the number of repelling electrodes is two. Reference numerals 1 to 9 in the figure denote the same elements as those in FIG. 1. Reference numerals 11' and 12' denote repelling electrode power supplies for applying electric potentials to the repelling electrodes 8 and 9.

In the magnetic field type mass spectrometer shown in FIG. 2, ions which are generated from the ion source 1 obtain a predetermined amount of energy at the electrode 2 for ion acceleration. Ions that have obtained the energy enter a magnetic field (analyzing part A) which is formed by the magnet 4 for analysis through the magnetic field entrance slit 3-1. Here, ions receive force (Lorentz's force) from the magnetic field, and move toward the repelling electrode 8, describing an arc-shaped trajectory $F_1$.

The repelling electrode 8 is under application of an electric potential so as to repel ions. Ions which are turned by the repelling electrode 8 move toward the repelling electrode 9, describing an arc-shaped trajectory $F_2$. The repelling electrode 9 is under application of an electric potential so as to repel ions. Ions which are turned by the repelling electrode 9 move toward the magnetic field exit slit 3-2, describing an arc-shaped trajectory $F_3$.

In the process of moving along the arc-shaped trajectories $F_1$, $F_2$ and $F_3$, ions are separated into ion species having different circular arcs, a radius of which is determined according to the mass-to-charge ratio and the velocity of ions, and only specific ions can reach the electrode 6 for ion current detection passing through the slits 3-3 and 3-4 and the magnetic field exit slit 3-2. An ammeter 7 is connected to the electrode 6 for ion current detection to detect ion species mass-separated. It should be noted that the power supplies 11' and 12' for repelling electrodes apply a predetermined value of electric potentials to the respective repelling electrodes 8 and 9, causing them to perform an operation of mass-separating ions in the process of passing along the trajectories $F_2$ and $F_3$.

Embodiment 3

Figure 3:
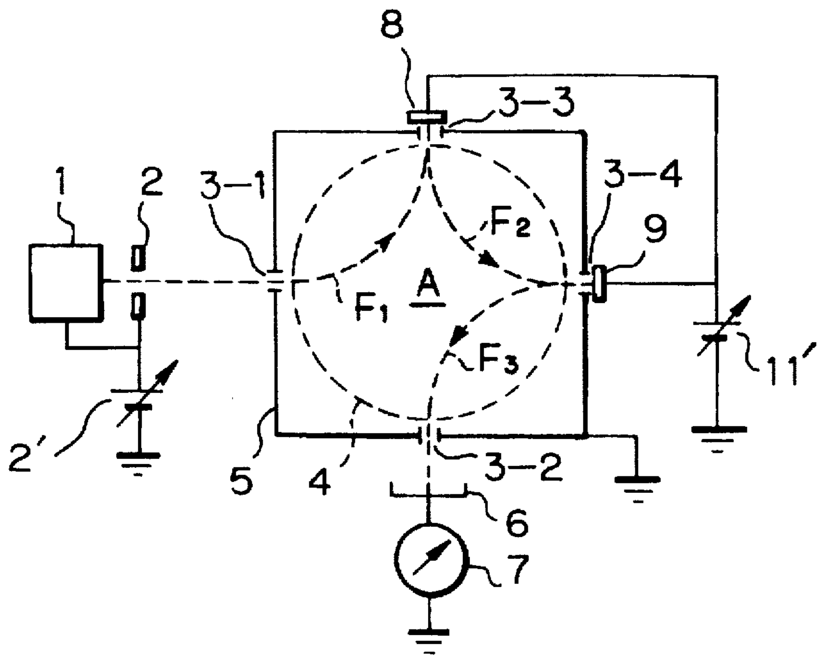
FIG. 3 is a view schematically showing an arrangement of a magnetic field type mass spectrometer according to a third embodiment of the present invention.

FIG. 3 schematically shows a further embodiment of a magnetic field type mass spectrometer according to the present invention. Reference numerals 1 to 9 in the figure denote the same elements as those in FIG. 1. Reference numeral 11' denotes a power supply for applying a fixed electric potential to the repelling electrodes 8 and 9 in order to allow only specific ion species to pass along a predetermined trajectory in an analyzing part A.

In the magnetic field type mass spectrometer shown in FIG. 3, ions which are generated from the ion source 1 obtain a predetermined amount of energy at the electrode 2 for ion acceleration. Ions that have obtained the energy enter a magnetic field (analyzing part A) which is formed by the magnet 4 for analysis through the magnetic field entrance slit 3-1. Here, ions receive a force (Lorentz's force) from the magnetic field, and move toward the repelling electrode 8, describing an arc-shaped trajectory $F_1$.

The repelling electrodes 8 and 9 are under application of the same electric potential from the power supply 11'. Ions which are turned by the repelling electrodes 8 and 9 move, describing arc-shaped trajectories $F_2$ and $F_3$. However, since the same electric potential is applied to the repelling electrodes 8 and 9, specific ions repelled by the repelling electrode 8 to pass along the trajectory $F_2$ are repelled by the repelling electrode 9 to move toward the magnetic field exit slit 3-2 along the trajectory $F_3$ of the same circular arc as that of the trajectory $F_2$. That is, ions passing along the trajectories $F_2$ and $F_3$of the same circular arc are only those which have circular arcs with the same radius determined according to the mass-to-charge ratio and the velocity of ions. Only the specific ions can pass the slits 3-3 and 3-4 and the magnetic field exit slit 3-2, and reach the electrode 6 for ion current detection.

Embodiment 4

Figure 4:
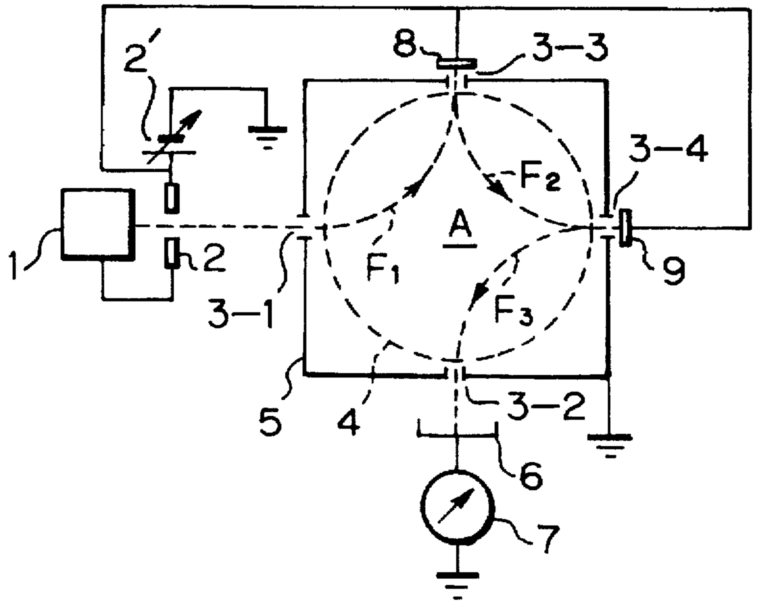
FIG. 4 is a view schematically showing an arrangement of a magnetic field type mass spectrometer according to a fourth embodiment of the present invention.

FIG. 4 schematically shows a still further embodiment of a magnetic field type mass spectrometer according to the present invention. Reference numerals 1 to 9 in the figure denote the same elements as those in FIG. 1. In this magnetic field type mass spectrometer, to effect mass sweep, the same electric potential as that applied to the electrode 2 for ion acceleration is applied to the repelling electrodes 8 and 9 from a power supply 2' for ion acceleration. Thus, it is possible to perform a mass spectrum analysis of ions generated from the ion source 1, for example, by gradually raising the electric potential of the power supply 2' for ion acceleration. It should be noted that the repelling electrodes 8 and 9 may be connected to a power supply which generates the same electric potential as that applied to the electrode 2 for ion acceleration synchronously with it.

Embodiment 5

Figure 5:
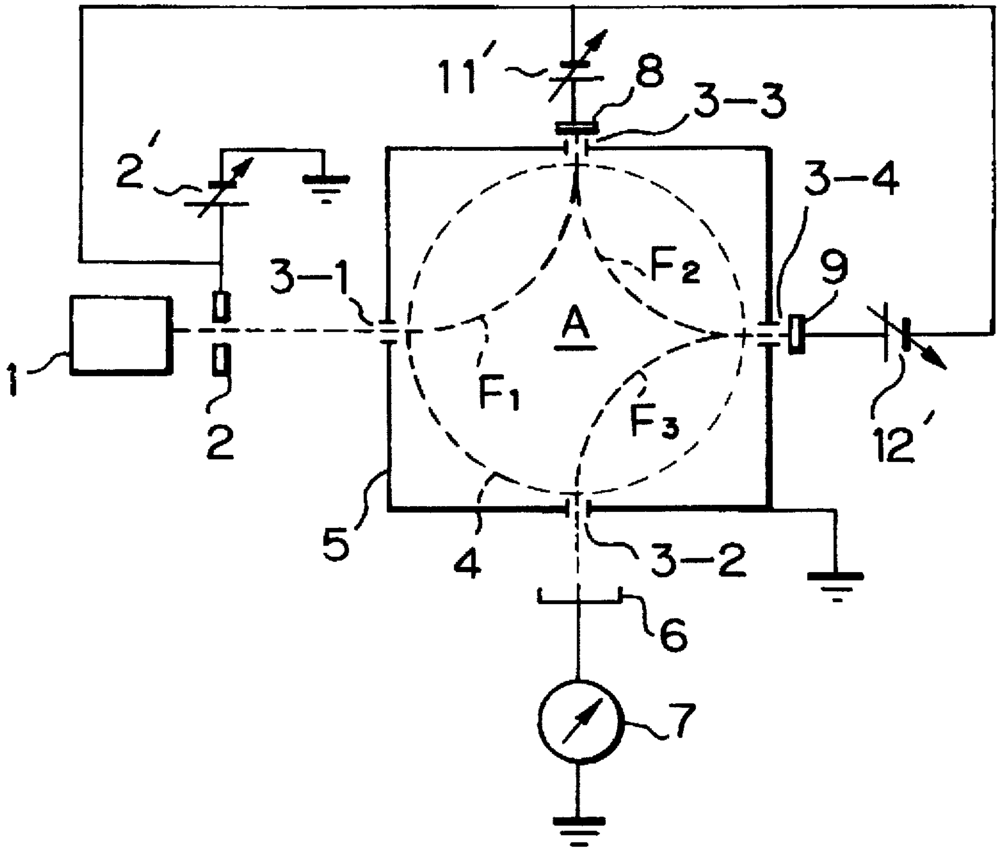
FIG. 5 is a view schematically showing an arrangement of a magnetic field type mass spectrometer according to a fifth embodiment of the present invention.

FIG. 5 schematically shows a fifth embodiment of a magnetic field type mass spectrometer according to the present invention. Reference numerals 1 to 9 in the figure denote the same elements as those in FIG. 1. In this magnetic field type mass spectrometer, electric potentials which are different from an electric potential applied to the electrode 2 for ion acceleration are applied to the repelling electrodes 8 and 9 from respective power supplies 11' and 12' synchronously with the power supply 2' for ion acceleration to perform an operation of mass spectrometric analysis. Instead, the repelling electrodes 8 and 9 may be connected to another power supply which generates a different electric potential from that applied to the electrode 2 for ion acceleration synchronously with it.

In this embodiment, since an electric potential which is different from the acceleration potential can be applied to the repelling electrodes, it is possible to adjust the trajectory of the ions formed within the analyzing part. Therefore, even if energy level or speed of ions produced in the ion source has some fluctuation, it is possible to adjust the trajectory of the ions so that they are most efficiently repelled at the repelling electrodes.

Embodiment 6

Figure 6:
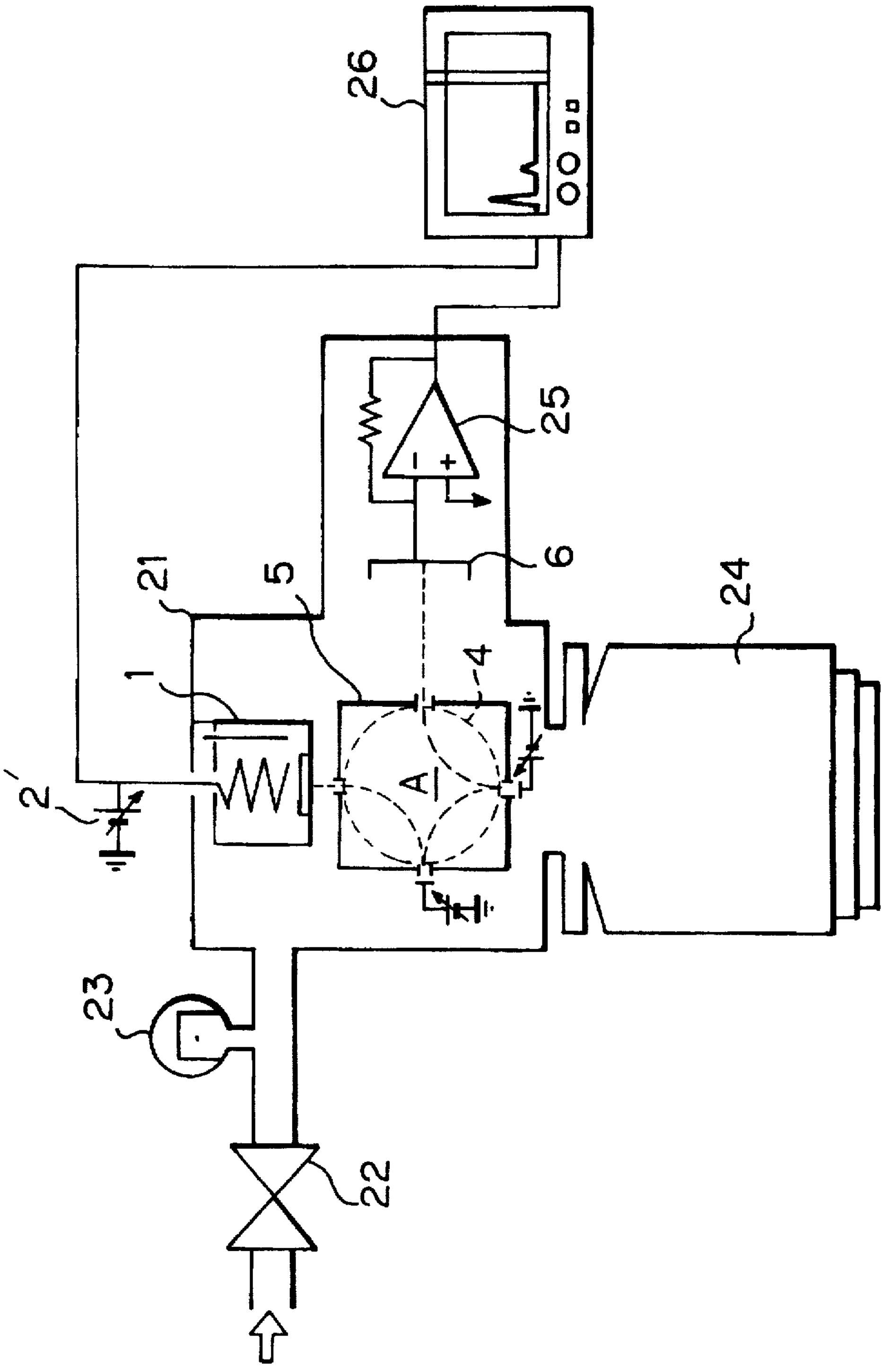
FIG. 6 is a view schematically showing an arrangement of a magnetic field type mass spectrometric apparatus which employs a magnetic field type mass spectrometer according to a sixth embodiment of the present invention.

FIG. 6 shows an arrangement of a magnetic field type mass spectrometric apparatus in which the above-described magnetic field type mass spectrometer is disposed in a vacuum chamber. In FIG. 6, reference numeral 21 denotes a vacuum chamber. In the vacuum chamber, an ion source 1 and an analyzing part A having a magnet 4 for analysis and a grounding electrode 5 are disposed. The vacuum chamber 21 is connected to a valve 22 for supplying a sample gas, a vacuum gauge 23, and a turbo-molecular pump 24. Further, the output of the electrode 6 for ion current detection is connected to an amplifier 25. The amplifier 25 is connected to an X-Y recorder 26.

In the magnetic field type mass spectrometric apparatus arranged as described above, the inside of the vacuum chamber 21 is evacuated to a high vacuum of about $5\times1/10^5$ Torr by the turbo-molecular pump 24, and supplied with a sample gas by opening the valve 22, thereby carrying out a mass spectrometric analysis. The result of the analysis is recorded in the X-Y recorder 26.

Figure 7:
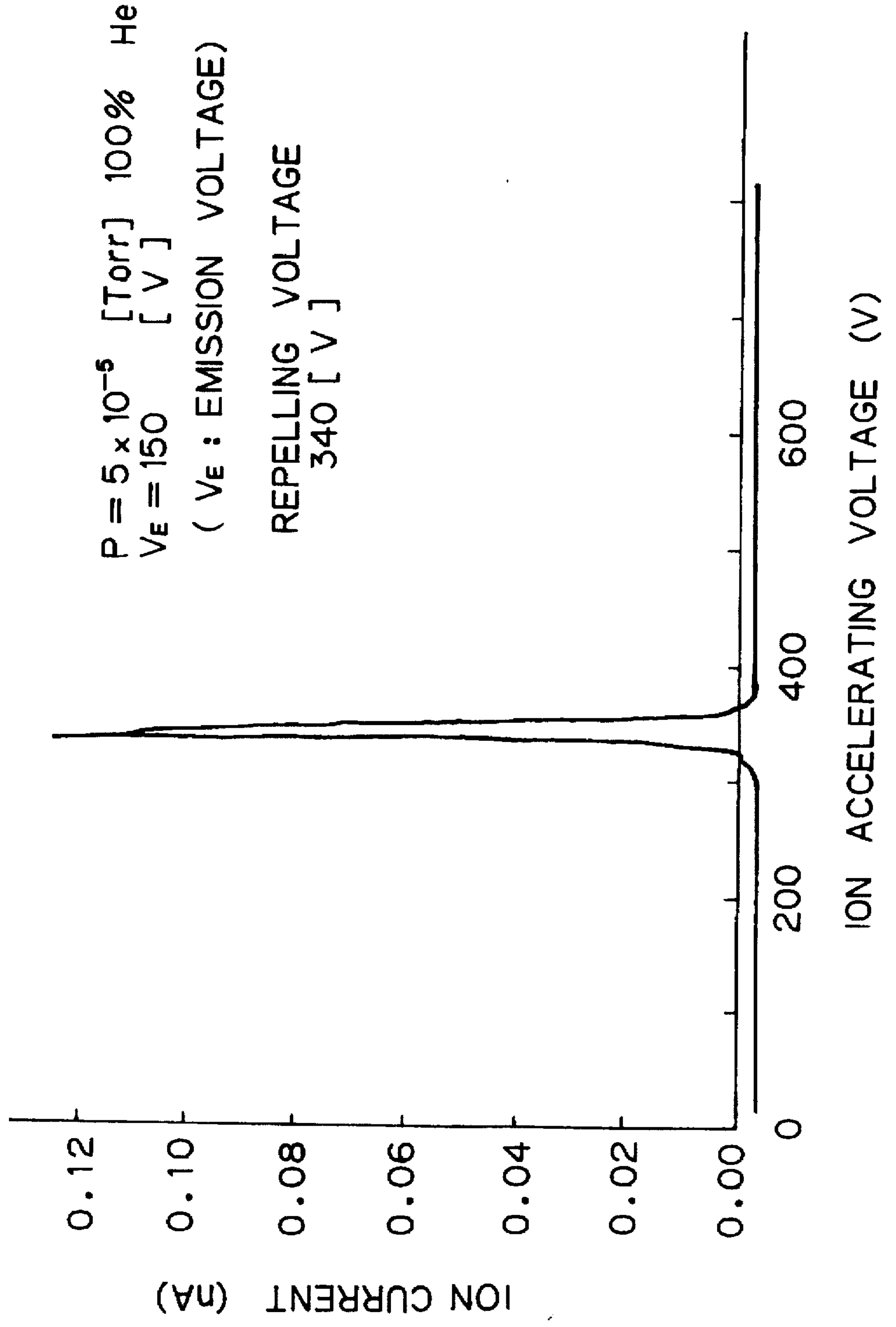
FIG. 7 is a graph showing the result of measurement of a fixed mode mass spectrum carried out by using a magnetic field type mass spectrometer according to the present invention.
Figure 8:
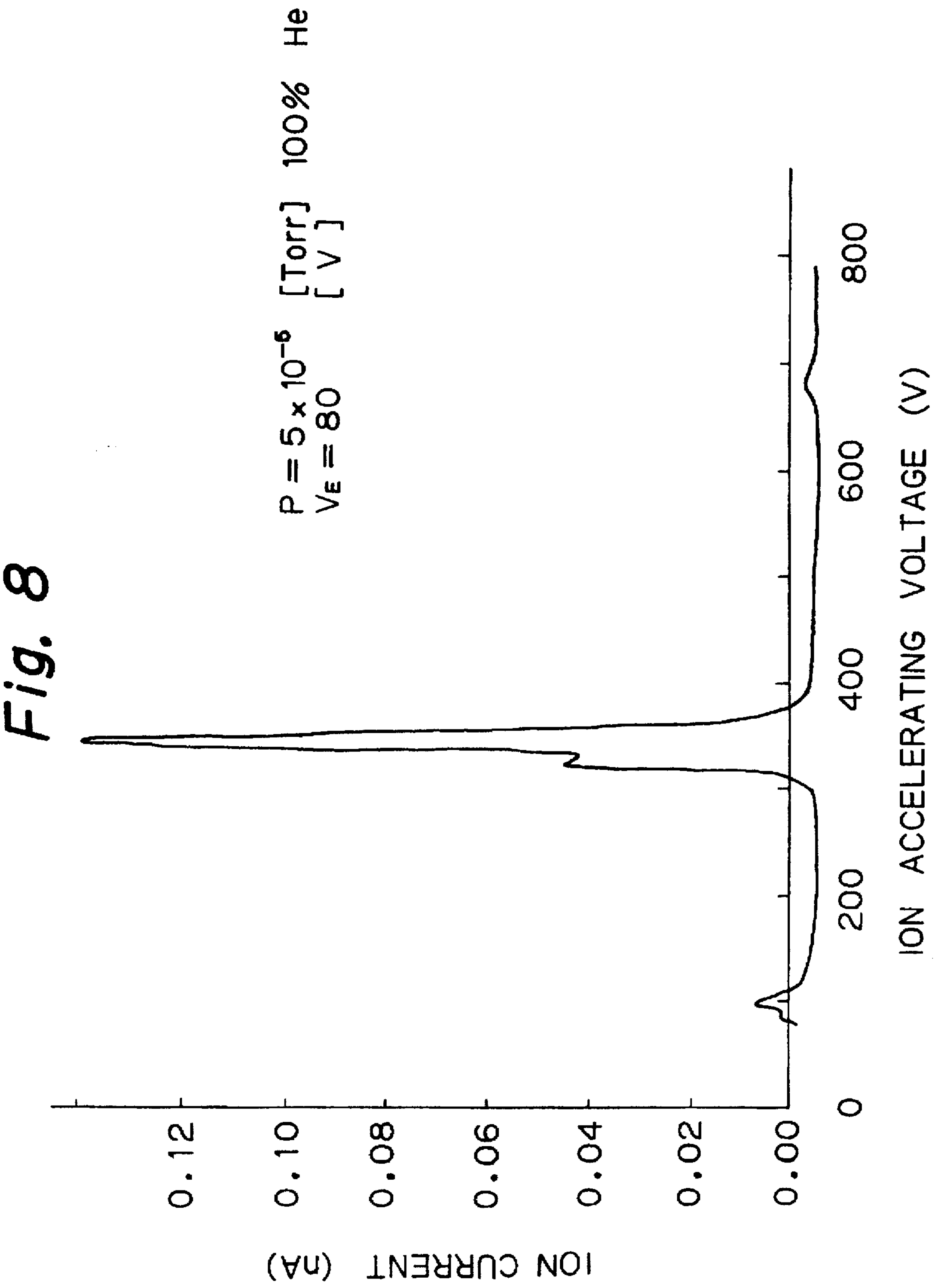
FIG. 8 is a graph showing the result of measurement of a sweep mode mass spectrum carried out by using a magnetic field type mass spectrometer according to the present invention.
Figure 9:
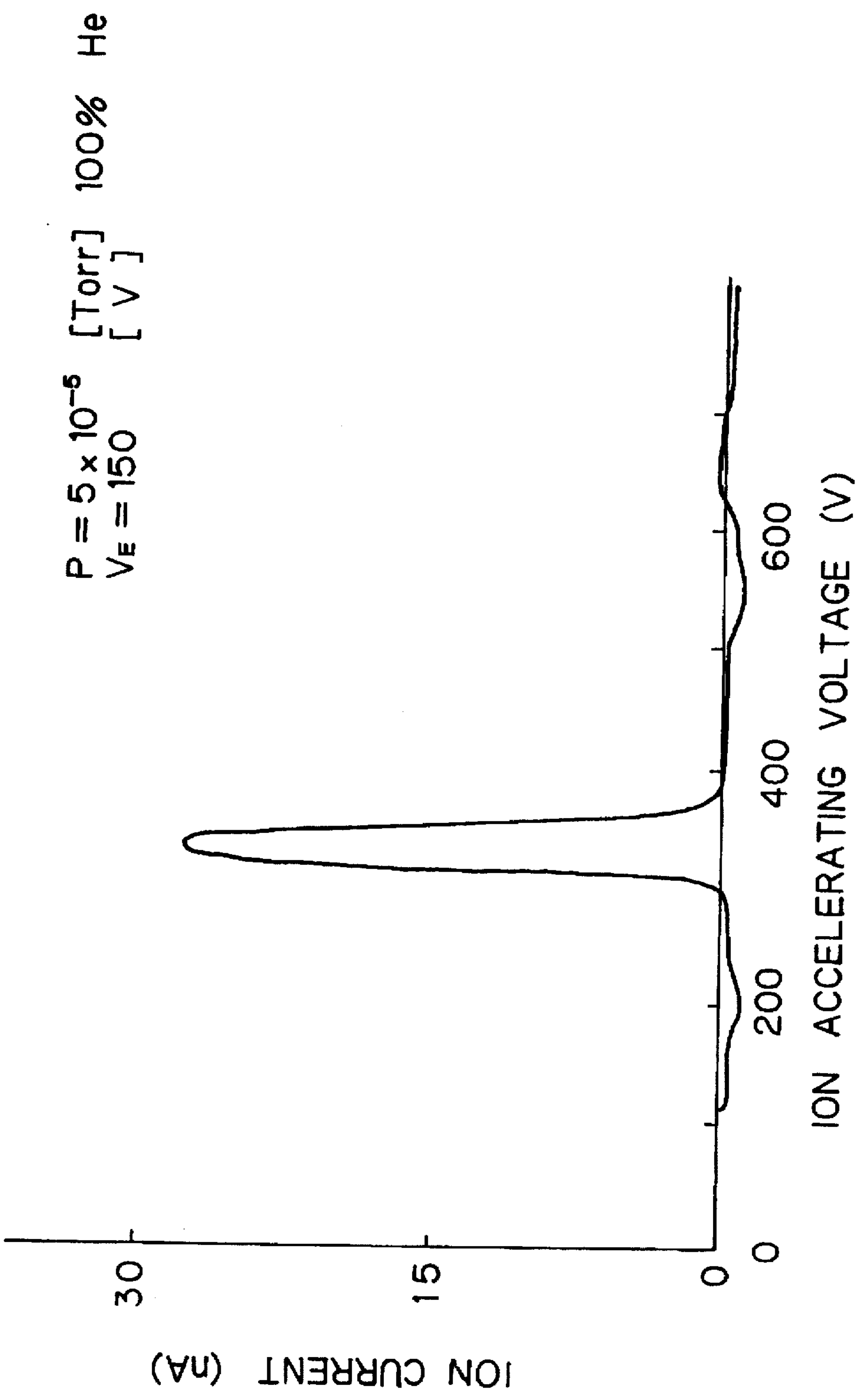
FIG. 9 is a graph showing the result of measurement of a mass spectrum carried out by using a conventional magnetic field type mass spectrometer.
Figure 11:
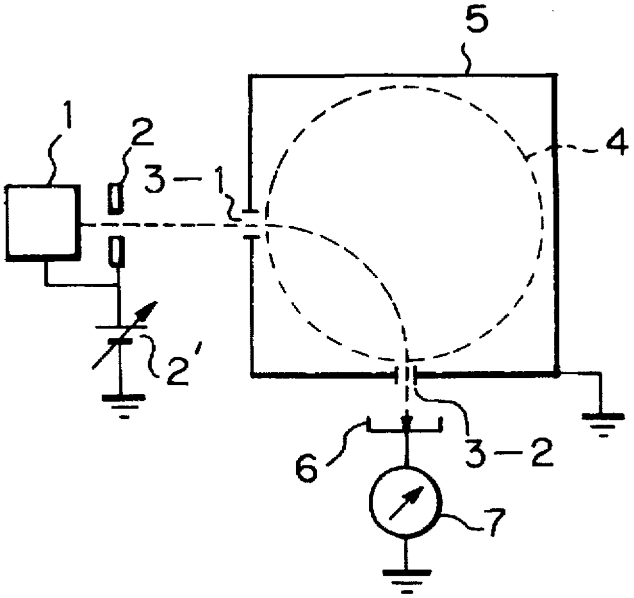
FIG. 11 is a view schematically showing an arrangement of a conventional magnetic field type mass spectrometer.

FIG. 7 is a graph showing the result of measurement of a fixed mode mass spectrum of He ions carried out by disposing a magnetic field type mass spectrometer having the arrangement shown in FIG. 3 in the chamber 21. FIG. 8 is a graph showing the result of measurement of a sweep mode mass spectrum of He ions carried out by disposing a magnetic field type mass spectrometer having the arrangement shown in FIG. 4 in the chamber 21. FIG. 9 is a graph showing the result of measurement of a mass spectrum of He ions carried out by disposing a magnetic field type mass spectrometer having the conventional arrangement shown in FIG. 11 in the chamber 21. As will be clear from the comparison of half band width between graphs of FIGS. 7, 8 and 9, the use of a magnetic field type mass spectrometer according to the present invention makes it possible to obtain resolution which is about four times as high as that obtained by using the conventional magnetic field type mass spectrometer.

Embodiment 7

Figure 10:
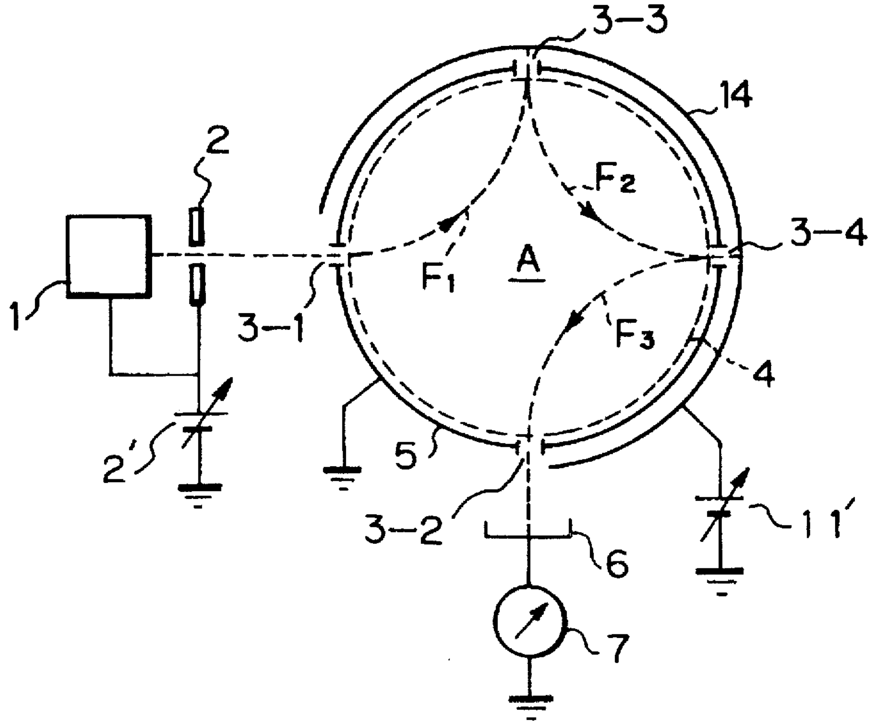
FIG. 10 is a view schematically showing an arrangement of a magnetic field type mass spectrometer according to a further embodiment of the present invention.

FIG. 10 schematically shows a further embodiment of a magnetic field type mass spectrometer according to the present invention. Reference numerals 1 to 7 in the figure denote the same elements as those in FIG. 1. In the magnetic field type mass spectrometer of this embodiment, a cylindrical electrode is used as a repelling electrode 14, and a cylindrical grounding electrode 5 which is concentric with the repelling electrode 14 is disposed inside the repelling electrode 14. Instead of the cylindrical repelling electrode 14, an arcuate grounding electrode may be installed at each turn point. With this arrangement, the magnetic field type mass spectrometer can be made even more compact.

Incidentally, in a fixed mode spectrum analysis of this invention (e.g. in FIGS. 1, 2, 3 and 10) in which electric potentials applied to the repelling electrodes are fixed at a predetermined value without changing them synchronously with an electric potential applied to an ion accelerating electrode, the electric potentials applied to the repelling electrodes are preferably set to be the same or slightly higher than the electric potential applied to the ion accelerating electrode.

Here, there is a following relationship among a radius r (cm) of ion moving trajectory, an ion mass number M, an electric potential V (V) applied to an electrode for ion acceleration and an intensity of magnetic field B (gauss).

$$r=143.9\ (\sqrt{MV})/B$$

where 143.9: physical constant (constant)

Thus, in the fixed mode spectrum analysis (e.g. in FIGS. 1, 2, 3 and 10) stated above, if, for example, the power supply for ion acceleration 2' is capable of varying an electric potential from 100 V to 1500 V, with a magnetic field intensity B of a magnet for analysis 4 being set at 2700 gauss; and if a helium ion, the mass number M of which is 4, should be moved along a trajectory (F1, F2, F3, F4) having the radius r=2 cm, then, an electric potential to be applied to the electrode for ion acceleration 2 can be obtained from the equation stated above as V=351.65 V. Therefore, the electric potential to be applied to the repelling electrodes (8, 9, 10, 14) should be set at 351.65 V or a slightly higher value, e.g. 352 V.

In the case of sweep mode spectrum analysis in which electric potentials applied to the repelling electrodes are changed synchronously with the electric potential applied to the ion accelerating electrode, if, for example in FIG. 4, the power supply for ion acceleration 2' is capable of varying an electric potential thereof from 100 V to 1500 V as in the aforementioned example, and a magnetic field intensity B of the magnet for analysis 4 is set at 2700 gauss, when the electric potential applied to the ion accelerating electrode 2' is varied from 100 V to 1500 V, then, the electric potentials applied to the repelling electrodes 8, 9 should also be changed synchronously therewith. Thus, for example, when the electric potential of the ion accelerating electrode 2' is set at 351.65 V, helium ions are moved along the specific trajectory F1, F2, F3 and, when the electric potential applied to the ion accelerating electrode 2' is changed to another electric potential, then another specific ion having a mass number which corresponds to the newly selected electric potential may move along the trajectory F1, F2, F3 and, by repeating this, spectrum analysis may be conducted.

In addition, for example, as shown n FIG. 5, by providing power supplies 11', 12' for each repelling electrode 8, 9, it is possible to set an electric potential applied to the repelling electrodes 8, 9 to be slightly higher than the electric potential applied to the electrode for ion acceleration 2'. For example, in an example shown in FIG. 5, if the power supply for ion acceleration 2' is capable of varying an electric potential from 100 V to 1500 V as in the aforementioned example, and if power supplies 11', 12' are provided for each repelling electrodes as stated above, the electric potential to be applied to the repelling electrodes 8, 9 may be set at a value which corresponds to the level of the electric potential of the ion accelerating electrode 2 plus an arbitral potential value, for example, 10 V at the most. By this arrangement, it is possible to positively repell ions without touching the repelling electrodes 8, 9.

As has been described above, according to the present invention, a magnet for mass separation is disposed so that ions move along a trajectory which turns several times in an analyzing part, and repelling electrodes for repelling ions are installed at turning points of the ions. Accordingly, there is produced a succession of arc-shaped trajectories along which ions move, and mass separation is carried out along each arc-shaped trajectory. Consequently, mass spectrometric analysis at high resolution can be effected, and thus it is possible to provide a magnetic field type mass spectrometer which is small in size and light in weight and which has high sensitivity, advantageously.

What is claimed is:

1. A magnetic field type mass spectrometer comprising an ion source, an ion accelerator for accelerating ions from said ion source, a mass separation magnet forming an analyzing part by a magnetic field of said mass separation magnet for changing a trajectory of ions accelerated by said ion accelerator, and a current detector for detecting an ion current.

characterized in that said mass separation magnet is installed so that said magnetic field thereof causes ions to move along a trajectory which turns several times in said analyzing part, and repelling electrodes are installed at turning points of said ions, whereby ions generated from said ion sources are caused to move along a trajectory which turns several times in said analyzing part, wherein, to effect mass sweep, the same electric potential as an acceleration potential applied to said ion accelerator is applied to the repelling electrodes synchronously with said acceleration potential.

2. A magnetic field type mass spectrometer comprising an ion source, an ion accelerator for accelerating ions from said ion source. a mass separation magnet forming an analyzing part by a magnetic field of said mass separation magnet for changing a trajectory of ions accelerated by said ion accelerator, and a current detector for detecting an ion current, characterized in that said mass separation magnet is installed so that said magnetic field thereof causes ions to move along a trajectory which turns several times in said analyzing part, and repelling electrodes are installed at turning points of said ions, whereby ions generated from said ion sources are caused to move along a trajectory which turns several times in said analyzing part, wherein, to effect mass sweep, an electrical potential different from an acceleration potential applied to said ion accelerator is applied to the repelling electrodes synchronously with the potential applied to said ion accelerator.

3. A magnetic field type mass spectrometer comprising an ion source, an ion accelerator for accelerating ions from said ion source, a mass separation magnet forming an analyzing part by a magnetic field of said mass separation magnet for changing a trajectory of ions accelerated by said ion accelerator, and a current detector for detecting an ion current, characterized in that said mass separation magnet is installed so that said magnetic field thereof causes ions to move along a trajectory which turns several times in said analyzing part, and repelling electrodes are installed at turning points of said ions, whereby ions generated from said ion sources are caused to move along a trajectory which turns several times in said analyzing part, wherein a grounding electrode is provided inside said repelling electrodes, said grounding electrodes having ion guiding slits provided at respective positions corresponding to said repelling electrodes.

4. A magnetic field type mass spectrometer according to claim 3, wherein said grounding electrode is disposed on a regional boundary of a magnetic field formed by said mass separation magnet.

5. A magnetic field type mass spectrometer comprising an ion source, an ion accelerator for accelerating ions from said ion source, a mass separation magnet forming an analyzing part by a magnetic field of said mass separation magnet for changing a trajectory of ions accelerated by said ion accelerator, and a current detector for detecting ion current, characterized in that said mass separation magnet is installed so that said magnetic field thereof causes ions to move along a trajectory which turns several times in said analyzing part, and a cylindrical repelling electrode for repelling ions is installed at turning points of said ions, and that a grounding electrode which is concentric with said repelling electrode is disposed inside said repelling electrode, said grounding electrode being provided with slits for guiding only ions moving along only a predetermined turning trajectory in said analyzing part to said repelling electrode, whereby ions generated from said ion source are caused to move along a trajectory which turns several times in said analyzing part.

6. A magnetic field type mass spectrometer according to claim 5, wherein an arcuate repelling electrode is installed at each turning point of said trajectory instead of using said cylindrical repelling electrode.

7. A magnetic field type mass spectrometer according to claim 5 or 6, wherein said grounding electrode is disposed on a regional boundary of a magnetic field formed by said mass separation magnet.

* * * * *